(No Model.)

C. E. L. BROWN.
ALTERNATING CURRENT MOTOR.

No. 515,900. Patented Mar. 6, 1894.

Witnesses:
J. Graef
F. M. Hall

Inventor:
Charles E. L. Brown
by Copek & Raegener
his Attorneys

UNITED STATES PATENT OFFICE.

CHARLES EUGEN LANCELOT BROWN, OF BADEN, SWITZERLAND.

ALTERNATING-CURRENT MOTOR.

SPECIFICATION forming part of Letters Patent No. 515,900, dated March 6, 1894.

Application filed June 13, 1893. Serial No. 477,490. (No model.) Patented in Switzerland December 21, 1892, No. 5,964, and in France December 26, 1892, No. 226,685.

*To all whom it may concern:*

Be it known that I, CHARLES EUGEN LANCELOT BROWN, a subject of the Queen of England, residing at Baden, in the canton of Aargau, Switzerland, have invented a certain new and useful Alternating-Current Motor, (for which I have obtained patents in Switzerland, dated December 21, 1892, No. 5,964, and in France, dated December 26, 1892, No. 226,685,) of which the following is a specification.

The object of my invention is to provide a non-synchronous single-phase alternating current motor which is capable of being started in a simple manner so as to start with considerable power without requiring an abnormal amount of energy at the starting, and the inducing winding of which is in direct connection with the conductors, whereas the induced winding is uniformly divided over the entire circumference of the induced iron body, is independent of the number of poles of the inducing winding and is short-circuited in itself. When such a motor is at rest and current is admitted, no turning moments are produced as the current generated in the induced parts are absolutely neutral in regard to the inducing current. The motor can be started very advantageously by destroying the neutral conditions existing when the motor is at rest.

In the accompanying drawings, Figure 1 is a front view of my improved motor. Fig. 2 is a side view of the same, parts being in section, and Figs. 3, 4, 5 and 6 are diagrammatical views illustrating the windings for the different conditions.

Similar letters of reference indicate corresponding parts.

The induced part, in this case the rotating part of the motor, has a winding analogous to the one found in the ordinary continuous current motors and the coils are connected with the collector C. Two diametrically opposite points of this winding are also connected with the two contact rings N N. On the collector two brushes B B rest which are shown short-circuited. If current is now admitted into the fixed winding $a$, currents are produced in the windings of the rotary part, which windings are short-circuited by the brushes B B, and thereby poles are formed, the positions of which in relation to the inducing poles are dependent on the position of the short-circuiting brushes B. It is thus evident that by corresponding positions of the brushes an attraction of the poles and thereby a powerful turning moment is produced, which, on account of the permanent fixed position of the brushes is not changed even when the motor is started. As soon as the motor has approached near synchronism, the two brushes $b$ $b$ on the brush rings N N are short-circuited, or a single wide contact can be brought in contact with both rings. The brushes B B can now be moved from the collector C and the motor will operate as a non-synchronous single-phase motor with short-circuited windings. This arrangement may be subjected to various modifications. The connections of the brushes B B in particular, may be made in various ways, some of which are shown more particularly in the diagrams Figs. 3, 4, 5 and 6. In these figures, L L are the mains, J J the inductor winding and A the rotary induced part with its collector C, the brushes B B, the contact rings N N and the brushes $b$ $b$. In the arrangement shown in Fig. 3, instead of directly short circuiting the brushes B B, the winding on the rotary part is connected in parallel with that on the fixed part. This arrangement does not differ greatly from an ordinary direct current shunt machine. The principal difference lies in the fact that the inductor winding has a relatively very small resistance and that the iron cores, both inside and outside, are laminated. A further difference lies in the fact that the magnetic field is of the form which would be produced by the combination of two direct current armatures carrying the windings in holes. By the passage of an electric current through the two windings, poles will be produced in the fixed and rotating parts as described, with reference to the arrangement shown in Figs. 1 and 2, and by suitable adjustment of the brushes B B these poles can be brought into such a position with regard to one another so as to cause the motor to instantly start. When the normal speed is reached the brushes $b$ $b$ are short-circuited and by means of a switch K, the circuit B B is opened. A resistance W serves to regulate the current at starting.

Figure 1:
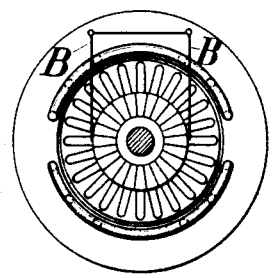
Figure 2:
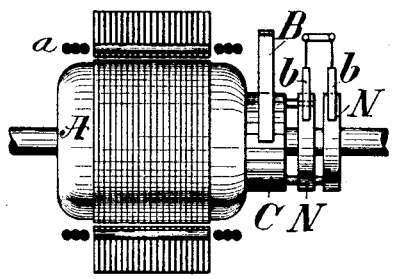
Figure 3:
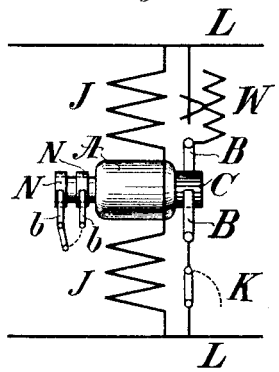
Figure 4:
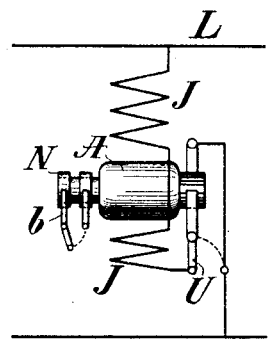
Fig. 4 shows a series arrangement of the inductor and the induced rotary part wherein by means of a switch U the ordinary working connection can be made after the motor has reached its full speed. The actions in this case are again similar to those in the above described arrangements.
Figure 5:
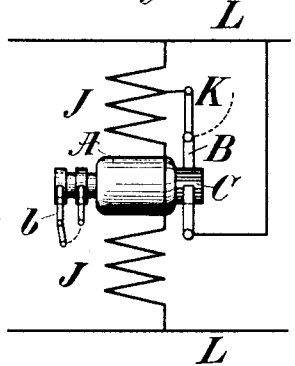
Fig. 5 shows an arrangement that differs from the arrangement described with reference to Fig. 3 in that the rotary part is connected as shunt to a certain number of turns of the inductor winding only.
Figure 6:
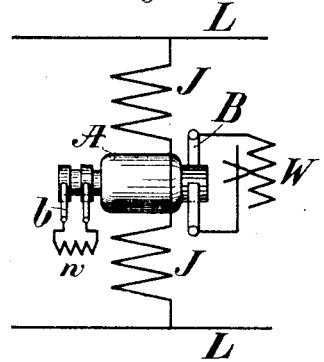
Fig. 6 is a diagram of connections similar to those more fully described with reference to Figs. 1 and 2, but with the difference that resistances W and w are inserted between the brushes b b as well as between B B thus allowing of a certain amount of regulation.

Instead of employing the usual windings of the induced parts described with reference to Figs. 1 and 2 diametrically arranged wires may also, for example, be connected to opposite segments of the collector without being in connection with the rest of the winding. Furthermore, the winding may be so arranged, that all the wires are connected at the end remote from the collector, but at the other end are directly connected together with such collector. Instead of only two diametrically opposite points being short-circuited after synchronous rotation has been obtained all the segments of the collector may be advantageously connected together either by a contact arranged to press on the side, or by slipping a conducting ring over the whole collector.

As will be obvious in all cases the inducing part may be arranged to rotate and the induced part be fixed. The slight differences of construction then necessary will be readily understood by persons skilled in the art to which this invention relates.

Having thus described my invention, I claim as new and desire to secure by Letters Patent—

A non-synchronous alternating current motor having its induced winding provided with a collector and corresponding brushes, connected and adjusted to produce poles in the induced winding, the position and action of which poles produce a turning moment and start the motor, and means for producing the short circuiting of the induced winding, after the motor has attained its normal speed, substantially as set forth.

In testimony whereof I hereunto sign my name in the presence of two subscribing witnesses this 24th day of April, 1893.

CHARLES EUGEN LANCELOT BROWN.

Witnesses:
EMIL BLUM,
H. LOBBARD.